(12) United States Patent
Zenz et al.

(10) Patent No.: US 7,797,522 B2
(45) Date of Patent: Sep. 14, 2010

(54) META ATTRIBUTES OF SYSTEM CONFIGURATION ELEMENTS

(75) Inventors: Ingo Zenz, Epfenbach (DE); Thomas Mueller, Oberkirch (DE)

(73) Assignee: SAP AG, Walldorf (DE)

( * ) Notice: Subject to any disclaimer, the term of this patent is extended or adjusted under 35 U.S.C. 154(b) by 830 days.

(21) Appl. No.: 11/323,110

(22) Filed: Dec. 30, 2005

(65) Prior Publication Data

US 2007/0156717 A1    Jul. 5, 2007

(51) Int. Cl.
G06F 9/00 (2006.01)
G06F 15/177 (2006.01)
G06F 15/173 (2006.01)
G06F 9/445 (2006.01)

(52) U.S. Cl. ............ 713/1; 713/100; 709/221; 709/223; 717/177

(58) Field of Classification Search ............ 713/1, 713/100; 709/221, 223; 717/177
See application file for complete search history.

(56) References Cited

U.S. PATENT DOCUMENTS

| | | | |
|---|---|---|---|
| 5,479,599 A | 12/1995 | Rockwell et al. | |
| 5,608,865 A | 3/1997 | Midgely et al. | |
| 5,758,154 A | 5/1998 | Qureshi | |
| 5,832,503 A | 11/1998 | Malik et al. | |
| 5,996,012 A * | 11/1999 | Jarriel | 709/226 |
| 6,041,347 A | 3/2000 | Harsham et al. | |
| 6,055,227 A | 4/2000 | Lennert et al. | |
| 6,148,277 A | 11/2000 | Asava et al. | |
| 6,161,176 A | 12/2000 | Hunter et al. | |
| 6,209,018 B1 | 3/2001 | Ben-Shachar et al. | |
| 6,314,460 B1 | 11/2001 | Knight et al. | |
| 6,341,372 B1 | 1/2002 | Datig | |
| 6,397,378 B1 | 5/2002 | Grey et al. | |
| 6,421,719 B1 | 7/2002 | Lewis et al. | |
| 6,490,690 B1 | 12/2002 | Gusler et al. | |
| 6,523,022 B1 | 2/2003 | Hobbs | |
| 6,735,691 B1 * | 5/2004 | Capps et al. | 713/1 |
| 6,832,298 B2 | 12/2004 | Fujii et al. | |
| 6,871,221 B1 | 3/2005 | Styles | |
| 6,898,703 B1 | 5/2005 | Ogami et al. | |
| 6,925,646 B1 | 8/2005 | Korenshtein et al. | |
| 6,950,931 B2 | 9/2005 | Wedlake | |

(Continued)

FOREIGN PATENT DOCUMENTS

EP    1486867    12/2004

(Continued)

OTHER PUBLICATIONS

Int'l Application No. PCT/EP2006/012357 Int'l Search Report and Written Opinion mailed Mar. 29, 2007.

(Continued)

*Primary Examiner*—Stefan Stoynov
(74) *Attorney, Agent, or Firm*—Schwegman, Lundberg & Woessner, P.A.

(57) ABSTRACT

A method and apparatus for meta attributes of system configuration elements. An embodiment of a method includes obtaining an attribute for a property for a configuration setting. The attribute includes a requirement regarding the property for the configuration setting. A value is resolved for the setting. The resolution of the value of the setting includes following the requirement of the attribute.

4 Claims, 7 Drawing Sheets

U.S. PATENT DOCUMENTS

| | | | |
|---|---|---|---|
| 6,996,517 | B1 | 2/2006 | Papaefstathiou |
| 7,054,924 | B1 | 5/2006 | Harvey et al. |
| 7,167,974 | B2 | 1/2007 | Roth et al. |
| 7,188,335 | B1 | 3/2007 | Darr et al. |
| 7,228,551 | B2 | 6/2007 | Karagounis et al. |
| 7,246,345 | B1 | 7/2007 | Sharma et al. |
| 7,260,818 | B1 | 8/2007 | Iterum et al. |
| 7,320,007 | B1 | 1/2008 | Chang |
| 7,343,601 | B2 | 3/2008 | Azagury et al. |
| 7,373,661 | B2 | 5/2008 | Smith et al. |
| 7,398,471 | B1 | 7/2008 | Rambacher et al. |
| 7,412,687 | B2 | 8/2008 | Goodwin et al. |
| 7,447,701 | B2 * | 11/2008 | Agarwal et al. .......... 707/103 Z |
| 7,480,643 | B2 | 1/2009 | Barsness et al. |
| 7,483,970 | B2 | 1/2009 | Anuszczyk et al. |
| 2002/0138652 | A1 | 9/2002 | Taylor |
| 2003/0041235 | A1 | 2/2003 | Meyer |
| 2003/0055529 | A1 | 3/2003 | Aosawa |
| 2003/0135638 | A1 | 7/2003 | Brabson et al. |
| 2003/0221094 | A1 | 11/2003 | Pennarun |
| 2003/0225867 | A1 | 12/2003 | Wedlake |
| 2004/0117452 | A1 | 6/2004 | Lee et al. |
| 2004/0162930 | A1 | 8/2004 | Forin et al. |
| 2004/0187140 | A1 | 9/2004 | Aigner et al. |
| 2004/0205584 | A1 | 10/2004 | Pezzanite |
| 2004/0230787 | A1 | 11/2004 | Blumenau et al. |
| 2005/0005005 | A1 | 1/2005 | Styles et al. |
| 2005/0050175 | A1 | 3/2005 | Fong et al. |
| 2005/0065993 | A1 | 3/2005 | Honda et al. |
| 2005/0071195 | A1 | 3/2005 | Cassel et al. |
| 2005/0085937 | A1 | 4/2005 | Goodwin et al. |
| 2005/0144428 | A1 | 6/2005 | Rothman et al. |
| 2005/0144528 | A1 | 6/2005 | Bucher et al. |
| 2005/0144610 | A1 | 6/2005 | Zenz |
| 2005/0240667 | A1 | 10/2005 | Koegel |
| 2005/0256732 | A1 | 11/2005 | Bauer et al. |
| 2005/0289169 | A1 | 12/2005 | Adya et al. |
| 2006/0041595 | A1 | 2/2006 | Taguchi et al. |
| 2006/0041881 | A1 | 2/2006 | Adkasthala |
| 2006/0047798 | A1 | 3/2006 | Feinleib et al. |
| 2006/0064673 | A1 | 3/2006 | Rogers et al. |
| 2006/0123409 | A1 | 6/2006 | Jordan et al. |
| 2006/0150178 | A1 | 7/2006 | Jerrard-Dunne et al. |
| 2006/0165123 | A1 | 7/2006 | Jerrard-Dunne et al. |
| 2006/0165223 | A1 | 7/2006 | Dugan et al. |
| 2006/0190579 | A1 | 8/2006 | Rachniowski et al. |
| 2006/0242626 | A1 | 10/2006 | Pham et al. |
| 2006/0242634 | A1 | 10/2006 | Fleischer et al. |
| 2007/0094359 | A1 | 4/2007 | Lamoureux |
| 2007/0118654 | A1 * | 5/2007 | Jamkhedkar et al. ........ 709/226 |
| 2007/0118888 | A1 | 5/2007 | Styles |
| 2007/0143480 | A1 | 6/2007 | Arroyo et al. |
| 2007/0156388 | A1 | 7/2007 | Kilian et al. |
| 2007/0156389 | A1 | 7/2007 | Kilian et al. |
| 2007/0156431 | A1 | 7/2007 | Semerdzhiev et al. |
| 2007/0156432 | A1 | 7/2007 | Mueller |
| 2007/0156641 | A1 | 7/2007 | Mueller |
| 2007/0156715 | A1 | 7/2007 | Mueller |
| 2007/0156904 | A1 | 7/2007 | Zenz |
| 2007/0157010 | A1 | 7/2007 | Zenz |
| 2007/0157172 | A1 | 7/2007 | Zenz et al. |
| 2007/0157185 | A1 | 7/2007 | Semerdzhiev |
| 2007/0162892 | A1 | 7/2007 | Zenz et al. |
| 2007/0165937 | A1 | 7/2007 | Markov et al. |
| 2007/0168965 | A1 | 7/2007 | Zenz |
| 2007/0257715 | A1 | 11/2007 | Semerdzhiev et al. |

FOREIGN PATENT DOCUMENTS

| | | |
|---|---|---|
| GB | 2374687 | 10/2002 |
| WO | WO-96/26588 | 8/1996 |
| WO | WO-2004109978 | 12/2004 |
| WO | WO-2005/045670 | 5/2005 |
| WO | WO-2007076944 A1 | 7/2007 |

OTHER PUBLICATIONS

PCT/EP2006/012356 International Search Report and Written Opinion Mailed Mar. 29, 2007.

Int'l Application No. PCT/EP2006/012358 Int'l Search Report & Written Opinion dated Jun. 14, 2007; 5 pgs.

Anonymous, "Using a Template Processor to Simplify Programming", *Research Disclosure*, Mason Publications, Hampshire, GB, vol. 41, No. 413, (Sep. 1, 1998), 1-3.

Microsoft Press, *Microsoft Computer Dictionary*, 4th Edition, Redmond, WA, 1999, pp. 123 and 183.

Accomazzi, Alberto, et al., *Mirroring the Ads Bibliographic Databases*, Astronomical Analysis Software and Systems VII, ASP Conference Series, vol. 145, 1998, pp. 395-399.

Cutler, Ellie, et al., *SCO UNIX in a Nutsell*, O'Reilly & Associates, Inc., Cambridge, MA, Jan. 1994, pp. 154-158.

Duquette, William H., et al., *Data Definition and Code Generation in TCL*, RIDE-VE '99, Sydney, Australia, Mar. 23-24, 1999, pp. 1-10.

Bartell, Randy L., et al., *The Mediaxact System—A Framework for Personalized Electronic Commerce Systems*, Bell Labs Technical Journal, vol. 4, Issues 153-173, Apr.-Jun. 1999, pp. 153-173.

Fernandez, Mary, et al., *Silkroute: Trading Between Relations and XML*, Computer Networks, vol. 33, Issues 1-6, Jun. 2000, pp. 723-745.

Hatley, John W., *Automatically Generating Procedure Code and Database Maintenance Scripts*, Ingres World, Chicago, IL, Oct. 2-6, 1994, pp. 1-11.

Non-Final Office Action dated Mar. 19, 2008, U.S. Appl. No. 11/322,701, filed Dec. 30, 2005, 12 pgs.

"OA Mailed Feb. 20, 2008 for U.S. Appl. No. 11/322,608", Whole Document.

Mueller, Thomas, et al., Final Office Action dated Sep. 2, 2008, U.S. Appl. No. 11/322,701, filed Dec. 30, 2005, 19 pgs.

USPTO, "OA Mailed May 22, 2008 for U.S. Appl. No. 11/322,401", Whole Document.

USPTO, "OA Mailed May 23, 2008 for U.S. Appl. No. 11/322,400", Whole Document.

USPTO, "FOA Mailed Sep. 4, 2008 for U.S. Appl. No. 11/322,608", Whole Document.

USPTO, "OA mailed Jan. 8, 2008 for U.S. Appl. No. 11/322,607", Whole Document.

USPTO, "Office Action mailed Jun. 26, 2008 for U.S. Appl. No. 11/322,607".

Int'l Application No. PCT/EP2006/012421, Int'l Search Report & Written Opinion dated Oct. 2, 2007, 14 pages.

Heiss, Kurt, ""Oracle Process Manager and Notification Server Administrator's Guide, 10g Release 2 (10.1.2)"", *10g Release 2* (10.1.2) Dec. 2004 XP002449016; Redwood City, CA, USA, *Retrieved from the Internet: URL:* http://download.oracle.com/docs/cd/B14 [ret'd on Aug. 31, 2007], (Dec. 2004), pp. 1-1 to pp. 1-26 and pp. 3-1 to pp. 3-30.

Final Office Action for U.S. Appl. No. 11/322,401 Mailed Nov. 19, 2008, whole document.

Non-Final Office Action for U.S. Appl. No. 11/322,509, Mailed Jan. 14, 2009, whole document.

Non-Final Office Action for U.S. Appl. No. 11/324,125, Mailed Jan. 23, 2009, whole document.

Non-Final Office Action for U.S. Appl. No. 11/322,511, Mailed Jan. 22, 2009, whole document.

Non-Final Office Action for U.S. Appl. No. 11/322,608, Mailed Feb. 13, 2009, 10 pages.

Feiler, P.H., et al., "Software Process Support Through Software Configuration Management", IEEE, (1990), 58-60.

Schlee, et al., "Generative Programming of Graphical User Interfaces", ACM, (2004), 403-406.

"U.S. Appl. No. 11/322,400, Non Final Office Action mailed May 23, 2008", 9 pgs.

"U.S. Appl. No. 11/322,400, Notice of Allowance mailed May 18, 2009", 7 pgs.

"U.S. Appl. No. 11/322,400, Notice of Allowance mailed Oct. 14, 2009", 7 pgs.
"U.S. Appl. No. 11/322,400, Notice of Allowance mailed Oct. 14, 2009", 8 pgs.
"U.S. Appl. No. 11/322,400, Notice of Allowance mailed Dec. 11, 2008", 4 pgs.
"U.S. Appl. No. 11/322,400, Response filed Sep. 23, 2008 to Non Final Office Action mailed May 23, 2008", 16 pgs.
"U.S. Appl. No. 11/322,401, Advisory Action mailed Feb. 26, 2009", 5 pgs.
"U.S. Appl. No. 11/322,401, Final Office Action mailed Nov. 19, 2008", 7 pgs.
"U.S. Appl. No. 11/322,401, Non Final Office Action mailed May 21, 2009", 10 pgs.
"U.S. Appl. No. 11/322,401, Non Final Office Action mailed May 22, 2008", 7 pgs.
"U.S. Appl. No. 11/322,401, Notice of Allowance mailed Dec. 31, 2009", 4 Pgs.
"U.S. Appl. No. 11/322,401, Preliminary Amendment filed Mar. 16, 2009", 11 pgs.
"U.S. Appl. No. 11/322,401, Response filed Feb. 19, 2009 to Final Office Action mailed Nov. 19, 2008", 7 pgs.
"U.S. Appl. No. 11/322,401, Response filed Aug. 22, 2008 to Non Final Office Action mailed May 22, 2008", 17 pgs.
"U.S. Appl. No. 11/322,401, Response filed Sep. 16, 2009 to Non Final Office Action mailed May 21, 2009", 10 pgs.
"U.S. Appl. No. 11/322,509, Non Final Office Action mailed Jan. 14, 2009", 11 pgs.
"U.S. Appl. No. 11/322,509, Response filed Mar. 31, 2009 to Non Final Office Action mailed Jan. 14, 2009", 13 pgs.
"U.S. Appl. No. 11/322,511, Non Final Office Action mailed Jan. 22, 2009", 13 pgs.
"U.S. Appl. No. 11/322,511, Notice of Allowance mailed Dec. 16, 2009", 8.
"U.S. Appl. No. 11/322,511, Response filed Apr. 9, 2009 to Non Final Office Action mailed Jan. 22, 2009", 17 pgs.
"U.S. Appl. No. 11/322,607, Non Final Office Action mailed Jan. 8, 2008", 10 pgs.
"U.S. Appl. No. 11/322,608, Final Office Action mailed Jul. 8, 2009", 9 pgs.
"U.S. Appl. No. 11/322,608, Final Office Action mailed Sep. 4, 2008", 11 pgs.
"U.S. Appl. No. 11/322,608, Non Final Office Action mailed Feb. 13, 2009", 8 pgs.
"U.S. Appl. No. 11/322,608, Non Final Office Action mailed Feb. 20, 2008", 8 pgs.
"U.S. Appl. No. 11/322,608, Response filed Jan. 5, 2010 to Final Office Action mailed Jul. 8, 2009", 9 pgs.
"U.S. Appl. No. 11/322,608, Response filed Apr. 21, 2009 to Non Final Office Action mailed Feb. 13, 2009", 16 pgs.
"U.S. Appl. No. 11/322,608, Response filed May 12, 2008 to Non Final Office Action mailed Feb. 20, 2008", 11 pgs.
"U.S. Appl. No. 11/322,608, Response filed Dec. 2, 2008 to Final Office Action mailed Sep. 4, 2008", 14 pgs.
"U.S. Appl. No. 11/322,628, Non-Final Office Action mailed Sep. 4, 2009", 14 pgs.
"U.S. Appl. No. 11/322,628, Response filed Dec. 2, 2009 to Non Final Office Action mailed Sep. 4, 2009", 16 pgs.
"U.S. Appl. No. 11/322,969, Advisory Action mailed Dec. 3, 2009", 3 pgs.
"U.S. Appl. No. 11/322,969, Final Office Action mailed Sep. 21, 2009", 10 pgs.
"U.S. Appl. No. 11/322,969, Non-Final Office Action mailed Apr. 1, 2009", 11 pgs.
"U.S. Appl. No. 11/322,969, Response filed Jun. 9, 2009 to Non Final Office Action mailed Apr. 1, 2009", 11 pgs.
"U.S. Appl. No. 11/322,969, Response filed Nov. 16, 2009 to Final Office Action mailed Aug. 21, 2009", 11 pgs.
"U.S. Appl. No. 11/322,969, Response filed Dec. 17, 2009 to Advisory Action mailed Dec. 3, 2009", 15 pgs.
"U.S. Appl. No. 11/323,059, Non-Final Office Action mailed Aug. 12, 2009", 11 pgs.
"U.S. Appl. No. 11/323,059, Response filed Nov. 6, 2009 to Non Final Office Action mailed Aug. 12, 2009", 10 pgs.
"U.S. Appl. No. 11/323,438, Final Office Action mailed Oct. 28, 2009", 25 Pgs.
"U.S. Appl. No. 11/323,438, Non Final Office Action mailed Apr. 1, 2009", 21 pgs.
"U.S. Appl. No. 11/323,438, Response filed Jun. 30, 2009 to Non Final Office Action mailed Apr. 1, 2009", 14 pgs.
"U.S. Appl. No. 11/324,125, Advisory Action mailed Oct. 1, 2009", 3 pgs.
"U.S. Appl. No. 11/324,125, Final Office Action mailed Jul. 27, 2009", 11 pgs.
"U.S. Appl. No. 11/324,125, Non Final Office Action mailed Jan. 23, 2009", 8 pgs.
"U.S. Appl. No. 11/324,125, Response filed Apr. 13, 2009 to Non Final Office Action mailed Jan. 23, 2009", 12 pgs.
"U.S. Appl. No. 11/324,125, Response filed Sep. 18, 2009 to Final Office Action mailed Jul. 27, 2009", 10 pgs.
"U.S. Appl. No. 11/322,701, Advisory Action mailed Oct. 21, 2008", 3 pgs.
" U.S. Appl. No. 11/322,701, Advisory Action mailed Dec. 23, 2008", 3 pgs.
"U.S. Appl. No. 11/322,701, Appeal Brief filed Mar. 26, 2009", 22 pgs.
"U.S. Appl. No. 11/322,701, Examiner Interview Summary mailed Dec. 11, 2008", 2 pgs.
" U.S. Appl. No. 11/322,701, Final Office Action mailed Sep. 2, 2008", 16 pgs.
" U.S. Appl. no. 11/322,701, Non Final Office Action mailed Mar. 19, 2008", 11 pgs.
" U.S. Appl. No. 11/322,701, Non-Final Office Action mailed Jul. 6, 2009", 15 pgs.
" U.S. Appl. No. 11/322,701, Response filed Jun. 10, 2008 to Non Final Office Action mailed Mar. 19, 2008", 12 pgs.
" U.S. Appl. No. 11/322,701, Response filed Sep. 25, 2009 to Non Final Office Action mailed Jul. 6, 2009", 10 pgs.
" U.S. Appl. No. 11/322,701, Response filed Oct. 14, 2008 to Final Office Action mailed Sep. 2, 2008", 9 pgs.
"J2EE Engine Bootstrap", *BIS Techdev*, printed on Sep. 26, 2005, http://bis.wdf.sap.corp/twiki/bin/view/Techdev/J2EEEngineBootstrap, 1-15.
Clark, et al., "Enabling Domain Experts to Convey Questions to a Machine: a Modified, Template-Based Approach", *ACM*, (2003), pp. 13-19.
Feller, Peter H., "Software Process Support Through Software Configuration Management", *IEEE*, (1990), 58-60.
Hall, et al., "Design: A Generic Configuration Shell, Proc of the 3rd International Conf. on industrial and engineering applications of artificial intelligenceand expert systems", vol. 1. Charleston, SC 1990, (1990), 500-508 pgs
Karlsson, et al., "Method Configuration: Adapting to situational characteristics while creating reusable assets", *Information and software technology*, vol. 46, Issue 9, (Jul. 1, 2004), 616-633 pgs.
Leffler, et al., "Building Berkeley UNIX Kernels with Config", *Computer Sytems reserach Group*, (Apr. 17, 1991), 2-1 and 2-31 pgs.
Robbins, et al., "Unix in a nutshell"*3rd edition*, O'Reilly & Associates, INC, (Aug. 1999), 215-221 and 265-266 pgs.
Schwanke, et al., "Configuration Management in BiiN SMS", *Proc. of the 11th International Conf. on software enginerring Pittsburgh*, (383-393 pgs), 1989
Symantec, Corp., "Norton Ghost™ User'Guide", *North Ghost™ User's Guide-Symantec. Norton Ghost The fast pc cloning solution.*, (1999), 138 pgs.
Williams, et al., "Embedded Linux as a platform for dynamically self-reconfiguration systems-ON-CHIP", (21-24 pgs), 163-169 pgs.

\* cited by examiner

META ATTRIBUTES OF SYSTEM CONFIGURATION ELEMENTS

TECHNICAL FIELD

Embodiments of the invention generally relate to the field of computer systems and, more particularly, to a method and apparatus for meta attributes of system configuration elements.

BACKGROUND

In complex computer systems, the development of a configuration for each particular computer environment can be difficult, and is often a matter of experimentation and guesswork to develop a working model. Because a complex system may include many disparate environments, this generally requires repeating the development process numerous times as various systems in different locations are configured.

If a configuration is developed for a system and is found to operate effectively, this generally is of little help for other systems. In a conventional operation, a developer or user may wish to copy a configuration over to another system or to develop a configuration for use in multiple systems, but this is generally not possible because of system dependencies built into the configuration. Certain elements of the configuration will depend on the characteristics of the individual computer systems that are configured, and such characteristics will generally be different for each system that is encountered.

A conventional system configuration is static, and thus is not adaptable to new environments. If a developer or user wishes to copy a working configuration for one system to another system or to develop a configuration for use in multiple computer systems, it is necessary to identify all system dependent configuration elements, to determine how the system dependent configuration elements need to be set to operate in each system, and then to set these configuration elements. Thus, the transfer of a configuration from one system to another is a time-consuming process, and the effort required to correct problems severely limits any advantage that might be gained in copying system configurations or attempting to a common configuration for multiple different systems.

In a conventional process, a configuration is limited to elements and values. Because of the limited information provided in the configuration, the configuration itself is limited in transferability between locations. A conventional configuration does not contain any data or attribute that would enable the transfer of the configuration to other systems. Further, a conventional configuration does not include any semantics that would ensure that valid information is stored for any property when the configuration is provided for a system.

SUMMARY OF THE INVENTION

A method and apparatus for meta attributes of system configuration elements are described.

In one aspect of the invention, an embodiment of a method includes obtaining an attribute for a property for a configuration setting. The attribute includes a requirement regarding the property for the configuration setting. A value is resolved for the configuration setting, with the resolution of the value of the setting including following the requirement of the attribute.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
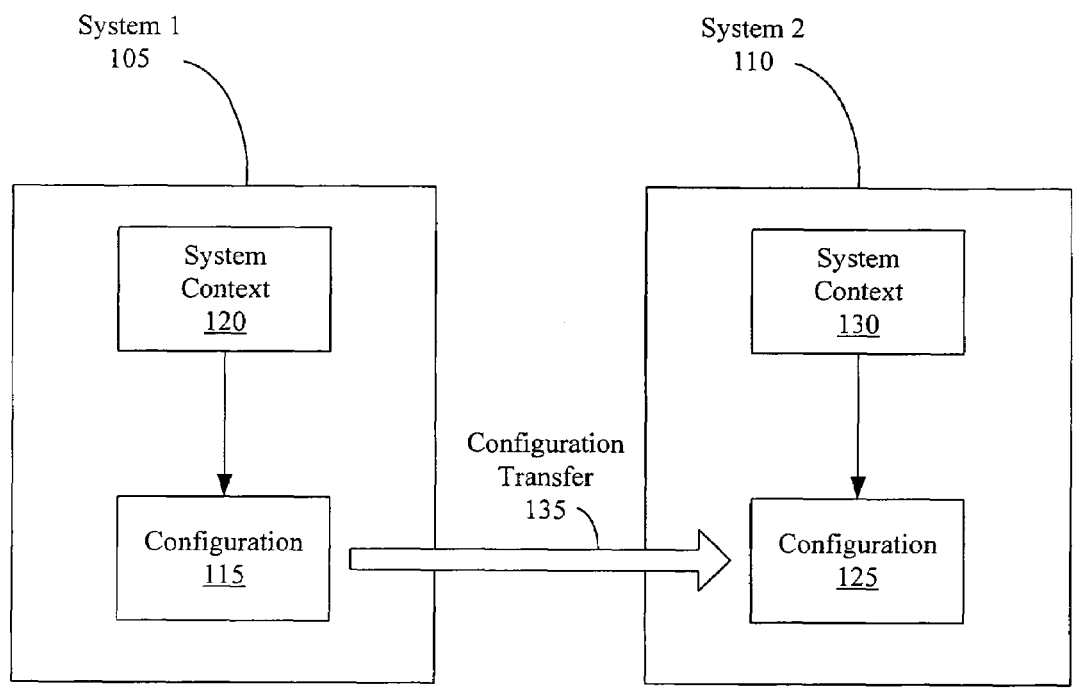
FIG. 1 is an illustration of the transfer of a configuration in an embodiment of the invention.

Embodiments of the invention are generally directed to a method and apparatus for meta attributes for system configuration elements.

As used herein, a "configuration" describes the manner in which a computer system, device, component, or other element, including any hardware, software, or both, is set up. A configuration may include, but is not limited to, the system name, the amount of memory available, the number of CPUs (central processing units) available, and other related information. A configuration may be described in various different ways in different settings, and may have a different name or designation in certain environments. To reduce repetitiveness in this description, a computer system, device, component, or other element may be referred to generally as a computer system or system. In this description, the computer system that receives a configuration may also be referred to as a configuration recipient or configuration consumer.

As used herein, a "meta attribute" is an attribute that provides a description of an element attribute. The concept may also be described as metadata, meaning data that describes other data.

In an embodiment of the invention, a configuration may be transferred between computer systems. For example, when a configuration has been developed for a system that works well for a certain use, that same configuration may be exported to another system that is different than the first system. In an embodiment, a configuration may be developed or generated for multiple different systems that have differing characteristics. In an embodiment of the invention, a configuration is virtualized for the elements of each system and is adaptable to each system. For example, a software vendor may utilize an embodiment of the invention to develop a self-adapting configuration together with a software product. In this example, the self-adapting configuration may be shipped together with the product in order to minimize configuration overhead for the customer.

In an embodiment of the invention, a system configuration utilizes abstract elements that are not dependent on the characteristics of any particular system. In an embodiment, the abstract elements of a configuration are resolved at run-time to generate values that apply to a particular computer system. As used herein, "abstract" means that an element has a value to be determined that is not tied to a particular system, use, or setting. The value of the element is thus expressed in an abstract fashion, with the value resolvable to a specific value in relation to a particular system that is assigned to the configuration.

In an embodiment of the invention, a system configuration is dynamic, and the determination of the settings for the configuration is based on the nature of each computer system and changes that may occur in a system. A dynamic configuration contrasts with a static configuration in a conventional system, in which the configuration elements need to be modified to work in a particular system. The elements of a dynamic configuration change as the configuration is applied to a system, and may be modified dynamically as the system is modified in order to reflect current values. Thus, in addition to providing for mobility of a configuration, the dynamic values provide for ease in maintenance of the configuration because the elements adapt to reflect the current state of the system.

In a conventional system, it is not generally possible to copy a configuration from one system to another or to generate a configuration that is usable for multiple different computer systems because of system dependencies. A conventional system will utilize a static configuration having set elements, and a static configuration will not transfer from one system to another system in the same form as was used in the original system. In conventional operations, it is necessary to manually modify each of the system dependent configuration elements to make such elements match the new system. Further, because of the system dependencies and the need to create new values for each configuration, there is no assurance in a conventional process that the same configuration will work in the same way in two systems after all of the elements have been set.

In an embodiment of the invention, a configuration is abstracted to eliminate the system dependencies in the configuration. In an embodiment, any system environment dependent settings are removed from a configuration database. Instead of static configuration values, a configuration introduces dynamic elements to reflect any current system. The dynamic elements may include parameters that characterize each system that receives the configuration. Parameters may include, but are not limited to, host names, instance names, the number of CPUs, the amount of available memory, and other hardware and software elements. In an embodiment of the invention, a configuration is dynamic and adapts itself to the system environment, thereby enabling the movement of the configuration from one system environment to another. In an embodiment, the only static settings that may exist in a configuration are non-system dependent settings that thus are not tied to any particular system.

In an embodiment, a configuration element or agent will evaluate abstract configuration elements and substitute the needed values into the configuration to reflect the characteristics of the system that is receiving the configuration. In one embodiment of the invention, a configuration machine or configuration manager will evaluate the abstract configuration elements and determine the values of the configuration elements for the relevant computer system. A configuration machine or manager may be, for example, an API (application program interface) that operates on top of a database for a system. In an embodiment, the configuration manager transparently evaluates the configuration values at run-time to adapt the configuration to the system. However, embodiments of the invention are not limited to any particular component, device, or process for the resolution of configuration elements, but rather include any internal or external agent that can process the configuration elements for a computer system.

In an embodiment of the invention, an abstract configuration may be created using various different processes. In one embodiment, API methods of a configuration manager may be used directly to generate the abstract configuration. In another embodiment a specially tagged property file, such as a JavaProperty file, may be imported into the configuration manager. For example, an enhanced property file may be imported as a property sheet into a configuration database. Other methods of generating the abstract configuration may be utilized, and embodiments of the invention are not limited to any particular generation process.

In an embodiment, system dependencies may include any characteristic of a system that may be found in a configuration. Dependencies may include system identification data, system information such as heap size and number of nodes, and hardware availability such as number of CPUs. Each system dependency is expressed in an abstract form in the virtualized configuration in a manner that does not refer to any particular system. The form of the elements in a virtualized configuration may vary in different embodiments. For example, system dependencies may include parameters that are substituted, parameters that require calculation, parameters that rely on or refer to other values, or other types of direct or indirect values.

In an embodiment of the invention, system configurations may include various default values that are substituted as the values are resolved for a particular computer system. In addition, configuration may be dependent on the intended use of a computer system. Various defaults or settings may be established for different types of uses. The different use cases may be addressed in various ways. In one example, templates, forms, or similar devices may be provided to establish certain parameter values for a configuration.

In an embodiment of the invention, configurations may be structured or developed in multiple levels, with, for example, "higher" levels providing default and abstract elements, which are shippable across system boundaries. In this example, an upper configuration level is applicable to all systems, but may, for instance, be overridden by lower level configuration levels in certain cases.

In one embodiment, below an upper configuration level may be a usage defined level, or template level, that provides configuration elements designed for particular use cases. In an embodiment of the invention a system provides for pre-defined configurations, which may include the use of templates, forms, or similar devices. The usage defined level may override upper level defaults. In an embodiment, the usage defined level is based on the system usage and not the particular system and thus the elements remain abstract for purposes of evaluation in conjunction with the characteristics of the receiving system. The different use cases may, for example, enable and disable components as needed for the particular use case. In one possible example, a developer may wish to turn off much of a system, minimizing the number of nodes, to maximize the system power available to the developer. In another example, a usage case may require enablement of all server nodes to enable the use of a portal that will carry a large amount of traffic.

In an embodiment of the invention, below the usage defined level may be a system level, which is based on the individual system instance. The system level includes defining the actual system instances belonging to the system. In an embodiment, each system instance derives its configuration from the template level. The settings received from the template level are abstract and dynamically resolved during runtime according to the given system context, which is attached to the system. Thus, in an embodiment of the invention a configuration is self-adapting to the particular system environment. In an embodiment, on the system level customizations might be made that are system specific and thus could be done in a generic or abstract manner on the template level. The system level defines the actual system instances belonging to the system. Each system instance derives its configuration from the template level. These derived settings will still be abstract and dynamically resolved during runtime according to the given system context, which is attached to the system. Thus, the configuration is self-adapting to the particular system environment. On the system level customizations might be done which are system specific and which could not be done in a generic (or abstract) way on the system or template level The system level may further include a custom level above the individual instance, with the custom level providing customization of the configuration for application to a particular site. In an embodiment, an additional modification may exist between the default level and the usage case level to provide customization that affects all use cases. Thus, customization may be done either for all instances at a higher level, or at the individual instance level.

As indicated above, among the possibilities for creating an abstract configuration are using configuration manager API methods directly, or importing a specially tagged property file into the configuration manager. In one embodiment, a tagged property file is imported and the data is stored within the configuration manager as a property sheet. In an embodiment, the property sheet is a representation of the properties, including the meta data, within the configuration manager. In an embodiment of the invention, a default configuration of a component is shipped together with the component configuration as an enhanced property file. In one example, the property file is a java.util.property object, which defines a persistent properties class in Java. However, embodiments of the invention are not limited to this type of object or file, and may be implemented in other forms that establish properties for files or objects.

In an embodiment of the invention, a property file is enhanced by tags, which may include descriptions, by flags, by type information, and by other enhanced information tags. The information is provided in order to mark the property so that the configuration manager is informed regarding how to thread the property. In one example, the additional information is attached to the java.util.Property file via special tags. In an embodiment of the invention, properties are enhanced by tag data, which may provide for a description, flags, type information, and other data.

In an embodiment of the invention, a method is a provided for creating property entries of a specific type. In an embodiment, the method creates an object of a type specified by the flags and sets its default values and description. In one example the parameters for the properties may include:
   Name—name of the property
   Default Value—default value of the property
   Description—description of the property
   Flags—flags specifying if the entry is secure, parameterized, computed, final, a value type, or a set of allowed values, or has other characteristics In an embodiment of the invention, properties are enriched by their meta attributes. In an embodiment, the meta attributes provided provide for data used in the evaluation and resolution of configuration elements. In an embodiment, the meta attributes provide various information about the properties, including how the properties should be interpreted, who should view the properties, what values may be resolved for a configuration, what security is in place, and whether the configuration values may be changed.

In one embodiment of the invention, a method includes the parameter "flags" to specify a bit list in which the different entry types can be combined. In one possible example, a property file may include flags that describe the nature of a value, that indicate how a value is to be derived from information, or that otherwise provide enhanced property descriptions. However, meta attributes are not limited to these attributes. Meta attributes of properties may include other items that describe and add value to properties.

In one example, flags used to provide meta attributes may include a flag to indicate security status, such as whether a value of a property is encrypted. Another flag may indicate whether a configuration entry should be interpreted to be a parameter, as opposed to set value. A flag may indicate whether an entry links to a value, and thus the entry contains a direction or pointer to a value rather than the value itself. A flag may indicate whether an entry is to be computed, thus whether the entry includes an expression that should be computed to obtain a value rather than holding the value itself. A flag may indicate whether an entry value is already final, and thus should not be subject to further modification. However, these are only examples of possible flags, and are not intended to describe an exhaustive list. To illustrate, a set of flags may include the following:

Secure=true|false

Specifies whether the value of the property is to be stored as an encrypted value.

Parameterized=true|false

Specifies whether the entry value is to be interpreted as one that contains one or more parameters to be substituted Propertylinked=true|false Specifies that the entry value is to interpreted as one that contains one or more value links to be resolved and substituted Computed=true|false Specifies whether the entry value is to be interpreted as an arithmetic expression that needs to be computed Final=true|false Specifies whether the entry is to be interpreted as final, indicating that the value cannot be overwritten in derived configurations In an embodiment of the invention, properties may also be enhanced with additional semantics, which may include a description, short text, logical data type, value range, and visibility. For example, the property values in a property file and generally all of type "String". From the semantic point of view, data may be interpreted as integers, double numbers, Boolean values, strings with specific values, or other data type. Such semantics may be specified via a logical data type and a value range. Further, visibility may be used to determine who should see the property. In one example, changing a property may have significant impacts, and thus the property may be set to be an "expert" property, thereby foreclosing "novice" users from seeing the property.

In an embodiment of the invention, the meta data may include the following:

Logical Data Type

The logical data type of a property may be designated as:

value=STRING|LONG|DOUBLE|BOOLEAN|ANY

Range

The range of a property can be specified as specific values, arrange of values or any value as:

value=({val_1,val_2,val_3, ... }|min_val-max_val]|
    [|])

Visibility

The visibility of a property can be specified as an expert property, a novice property, or any user as:

value=EXPERT|NOVICE|ANY

In an embodiment of the invention, the technical configuration of a Java system is simplified through the use of virtualized and adaptive configuration. Embodiments of the invention may be described herein in terms of Java objects and processes. However, embodiments of the invention are not limited to any particular system environment. Embodiments of the invention may be applied to any computer environment which includes the use of a configuration or similar structure with one or more system dependent elements.

The architectures and methodologies discussed above may be implemented with various types of computing systems such as an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Other embodiments may be implemented in the context of various different software platforms including, by way of example, Microsoft .NET, Windows/NT, Microsoft Transaction Server (MTS), the Advanced Business Application Programming ("ABAP") platforms developed by SAP AG, and other computer platforms. Software may include instructions stored on a computer-readable medium for execution by a processor.

FIG. 1 is an illustration of the transfer of a configuration in an embodiment of the invention. In this illustration, a first computer system (system 1 105) has a particular configuration 115 that is based at least in part on the system context 120, which includes such elements as the system name, the instance host name, the number of CPUs, the amount of memory available, and other related system factors.

A second computer system (system 2 110) also contains a configuration 125 that is based at least in part on the system context 130 of the second system 110. If the configuration 115 of the first system 105 has been developed and would be useful in the second system, then there is an incentive to transfer the configuration 135 and thus to re-use the development efforts that went into generating the configuration 115. However, in a conventional process, a configuration generally cannot not be easily copied or transferred because the elements of the configuration are based on the specific system context 120 of the first system 105. In order to perform the transfer of the configuration, the resulting configuration 125 for the second system 110 would have to be modified and corrected to match the system context 130 of the second system 110, which may be a very time consuming process.

In an embodiment of the invention, a configuration is developed as a virtualized, adaptable configuration that is based on abstract configuration data, and that does not contain any system dependent elements. In this embodiment, the abstract configuration may be provided to the second system 110. The elements of the abstract configuration would be resolved based on the system context 130 of the second system 130 to form the configuration 125 for the second system 110. In an embodiment, it is possible to transfer 135 an adaptable configuration 115 of the first system 105 to the second system 110, or to develop a configuration that is usable in both systems. The abstract and adaptable nature of such virtualized configuration allows for transfer without first making corrections and modifications to the configuration.

In an embodiment of the invention, the transferred configuration 125 will be automatically resolved, such as through use of a configuration machine or engine. The automatic resolution process may include the transformation of any indirect references, calculated references, and other parameters as needed to match the system context 130 of the second system 110.

Figure 2:
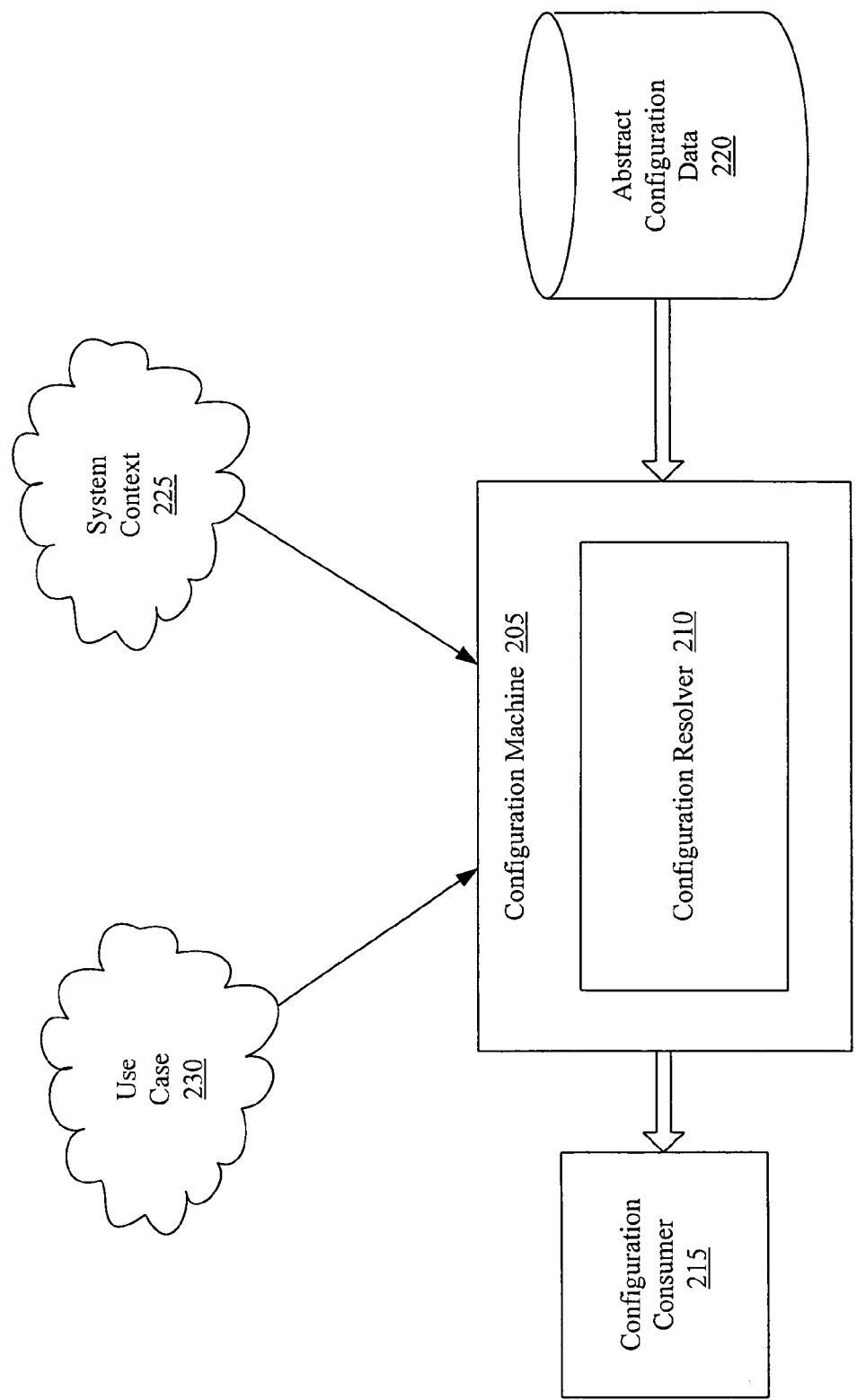
FIG. 2 is an illustration of an embodiment of a system for generation of a configuration.

FIG. 2 is an illustration of an embodiment of a system for generation of a configuration. In this illustration, a configuration machine 205 is used to provide a configuration to a consumer of the configuration 215. The consumer may be any component, device, or system that requires a configuration for a particular use. In an embodiment of the invention, a database includes abstract configuration data 220, the abstract data being configuration elements that are not tied to any particular system, but rather are adaptable to a system that receives the configuration. For example, the same abstract configuration data may be used in multiple different systems even though the systems have different system characteristics that require different configuration elements.

In an embodiment of the invention, a configuration machine 205 includes a configuration resolver 210. The configuration machine 205 receives the abstract configuration data 220 and the configuration resolver 210 resolves the elements of the abstract configuration data to apply to a particular system, in this case including the configuration consumer 215. The configuration is resolved based at least in part on the system context 225 of the relevant system, which includes relevant data regarding the particular system 215 that is to receive the configuration.

In an embodiment of the invention, a configuration may also be based on the particular use case intended for the system 230. Thus, the configuration may be formed based at least in part on the particular use case of the configuration consumer 215. The use case may provide certain system default elements that are designed for particular uses of a system.

Figure 3:
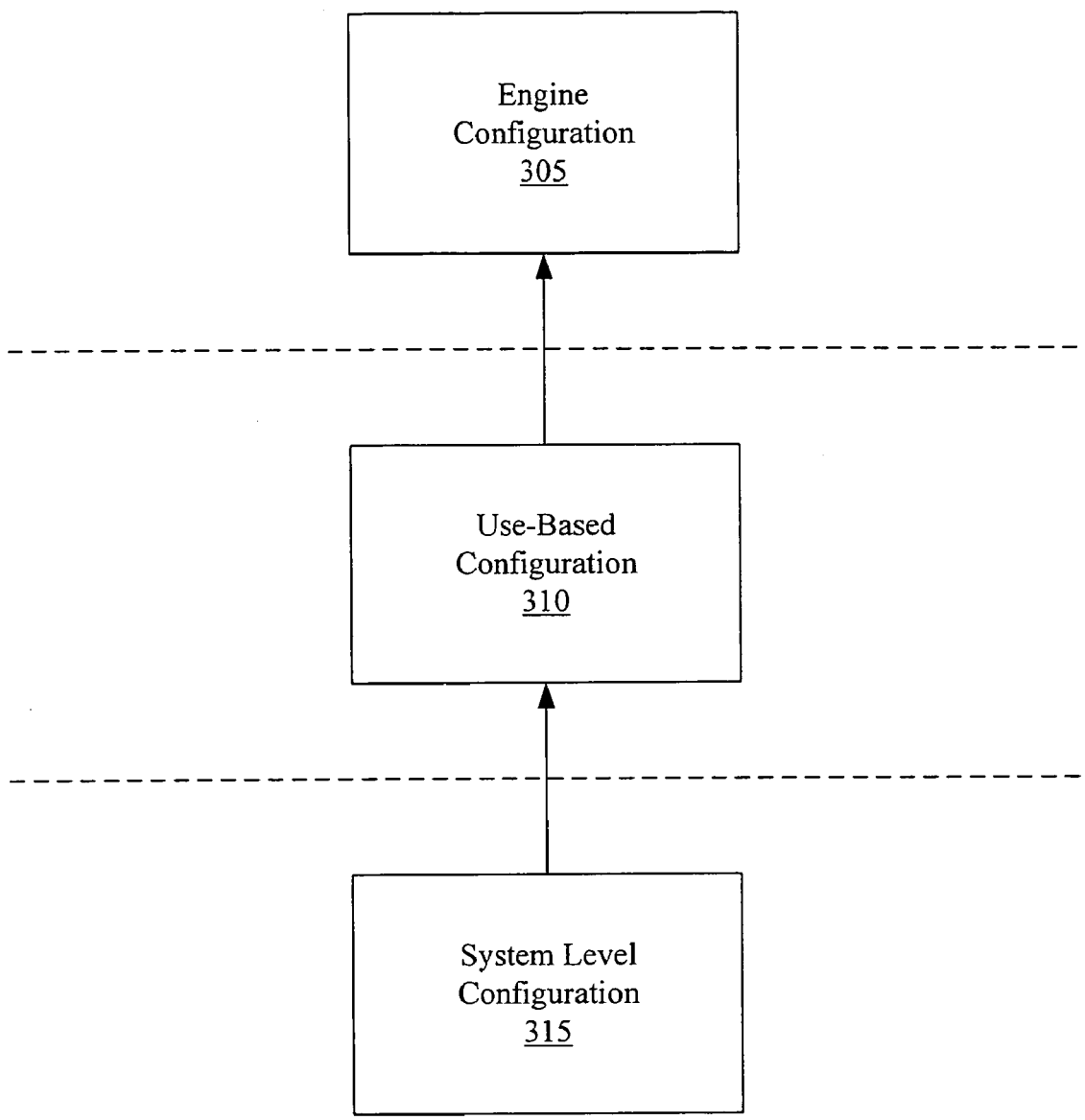
FIG. 3 is an illustration of an embodiment of configuration development.

FIG. 3 is an illustration of an embodiment of configuration development. In an embodiment of the invention, a configuration may be developed in levels, with upper levels providing defaults that may be overridden in lower levels. In an embodiment of the invention, a configuration may inherit elements from upper levels. In one example, an engine level configuration 305 may represent a basic default configuration that is not designed for any particular use or system. The configuration may include abstract elements that are structured as required for a configuration engine or machine that will resolve the elements for a particular system.

In this example, a use-based (or template) configuration level 310 then defines configurations that are based at least in part on an intended use for a system. This level may provide settings that are appropriate for a particular purpose, which may then be modified as appropriate. In one example, the use-based configuration level may provide that a certain number of nodes be turned on for the purpose of a particular use case.

A system level configuration 315 inherits a configuration from the use-based configuration level. In some instances, the configuration may be further customized at the system level. The system level defines the actual system instances belonging to the system, with each system instance deriving its configuration from the template level. The derived settings remain abstract and are dynamically resolved during runtime according to the given system context attached to the system. In this manner, a configuration is self-adapting to the particular system environment. On the system level, customizations may be implemented that are system specific, and that could not be accomplished in a generic or abstract manner in an engine level or template level configuration.

Figure 4:
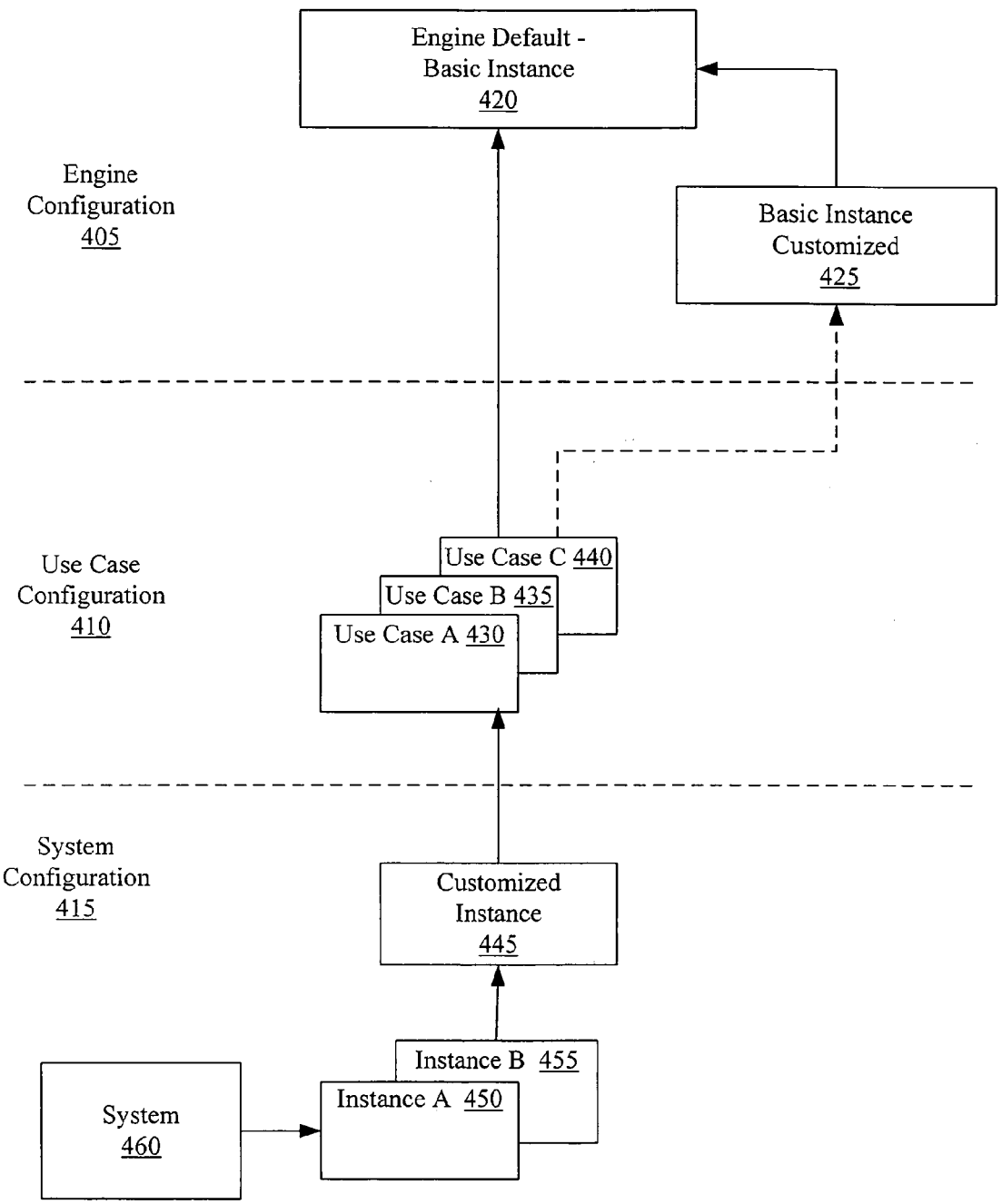
FIG. 4 is an illustration of an embodiment of configuration development.

FIG. 4 is an illustration of an embodiment of configuration development. In FIG. 4 a particular example of configuration development is described, but embodiments of the invention are not limited to this particular structure.

In this illustration, an engine configuration level 405 is illustrated. At this level a configuration engine default configuration is formed 420, which provides a basic instance of the configuration. The basic instance is a virtualized configuration that is abstract and is not tied to any particular system or used case. In one example, a customization of the basic instance 425 may be provided, such customization providing a possible modification of all configuration instances for a system regardless of the particular use of the system.

Also illustrated in FIG. 4 is a use case configuration, the use case providing the configuration for various different uses of a system, which are illustrated here as Use Case A 430, Use Case B 435, and Use Case C 440. Each use case provides a template or form for a configuration for a particular use of a system. The use case configuration remains an abstract level that is not tied to a particular system.

A system configuration is also illustrated, including one or more different configuration instances, such as Instance A 450 and Instance B 455. In an embodiment of the invention, the context information for the configuration instances will be accessed in the system context. In an embodiment, the system configurations contain information about the instances that are part of the system, and may further include customizations that could not be defined on an abstract level. In this illustration, the system configuration may also include a customized instance 445, which provides customization for instances received for various different use cases. In other embodiments, there may be multiple customized instances, depending on the particular type of configuration being established.

Figure 5:
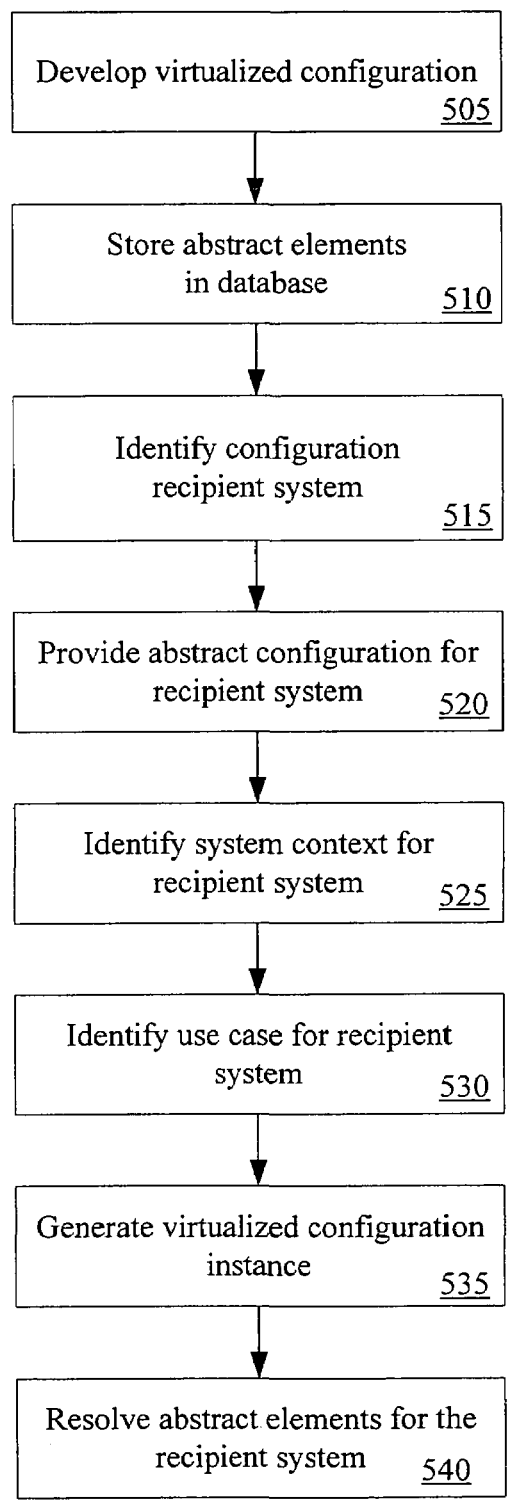
FIG. 5 is a flowchart to illustrate an embodiment of configuration generation.

FIG. 5 is a flowchart to illustrate an embodiment of configuration generation. In this illustration, a virtualized configuration is developed 505, the virtualized configuration including one or more abstract elements that are not tied to any particular computer system. In an embodiment, the virtualized configuration is adaptable, with the abstract elements intended to be resolved to reflect appropriate values for a system that is receiving a configuration.

In this illustration, the abstract elements may be stored in a database 510, although the process of building up a configuration may vary in different embodiments of the invention. A recipient system for the configuration is identified 515, and an abstract configuration is provided for the recipient system 520. A configuration engine or other agent may be responsible for generating the configuration and resolving the abstract elements of the configuration. As a part of this process, the system context is identified for the recipient system 525, which thus provides the characteristics of the system for purposes of resolving the configuration elements. A use case may also be identified 530, which may be applicable if a form or template is available to establish a customized configuration.

A virtualized configuration instance is then generated 535. The configuration engine resolves the abstract elements of the configuration instance for the recipient system 540. In this manner, the configuration adapts to the recipient system, with resolution taking place during runtime within the recipient system.

Figure 6:
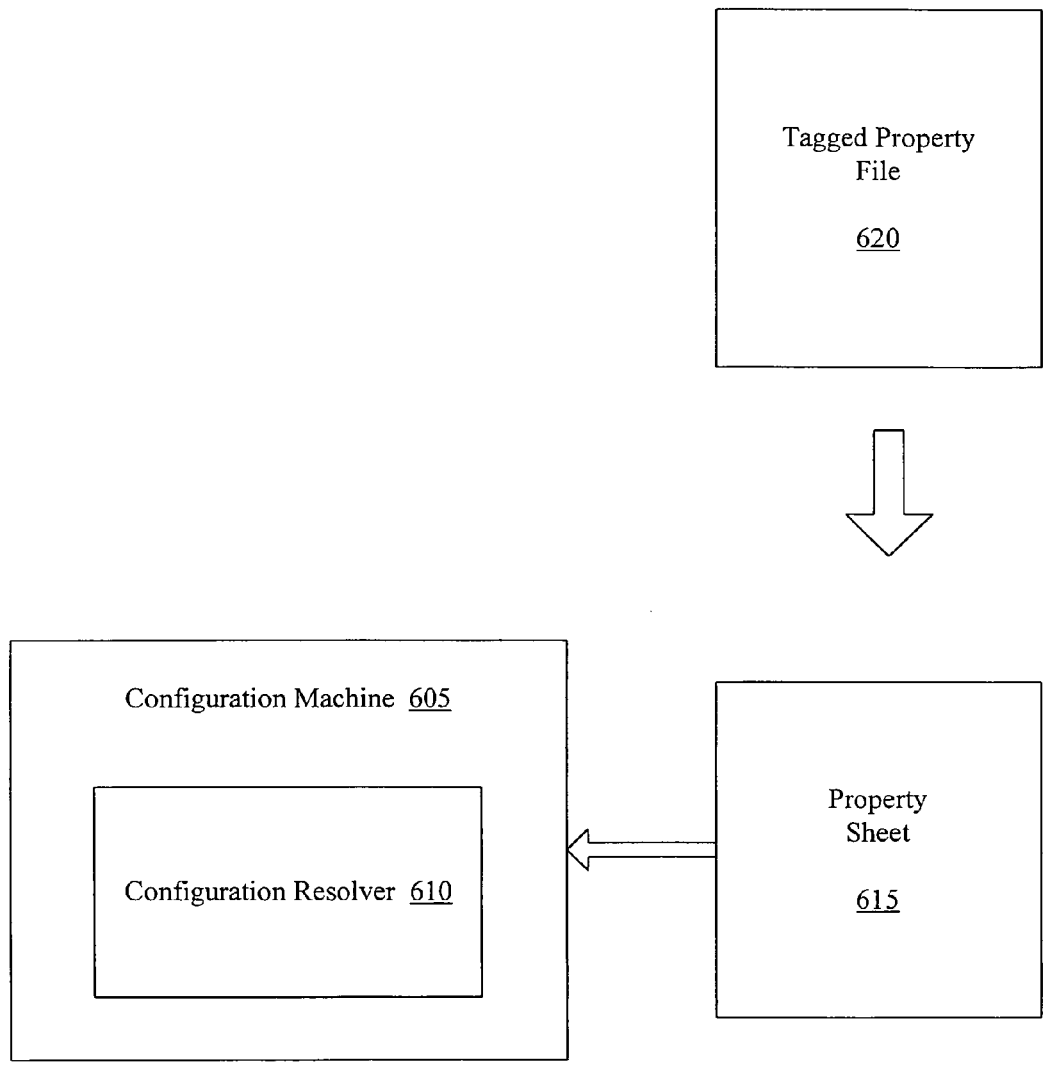
FIG. 6 is an illustration of an embodiment of configuration generation using a property sheet.

FIG. 6 is an illustration of an embodiment of configuration generation using a tagged property file. In an embodiment of the invention, a property sheet 615 is provided for a configuration machine 605. The configuration machine 605 may include a configuration resolver 610, which will utilize the property sheet in the resolution of configuration elements.

In an embodiment of the invention, the property sheet is created via the importation of a tagged property file 620. In an embodiment of the invention, a default configuration of a component is shipped together with the component configuration as an enhanced property file, such as the tagged property file 620. In one example, the tagged property file is a java.util.property object. In an embodiment of the invention, the tagged property file 620 may include various attributes for use in utilizing and interpreting the properties.

Figure 7:
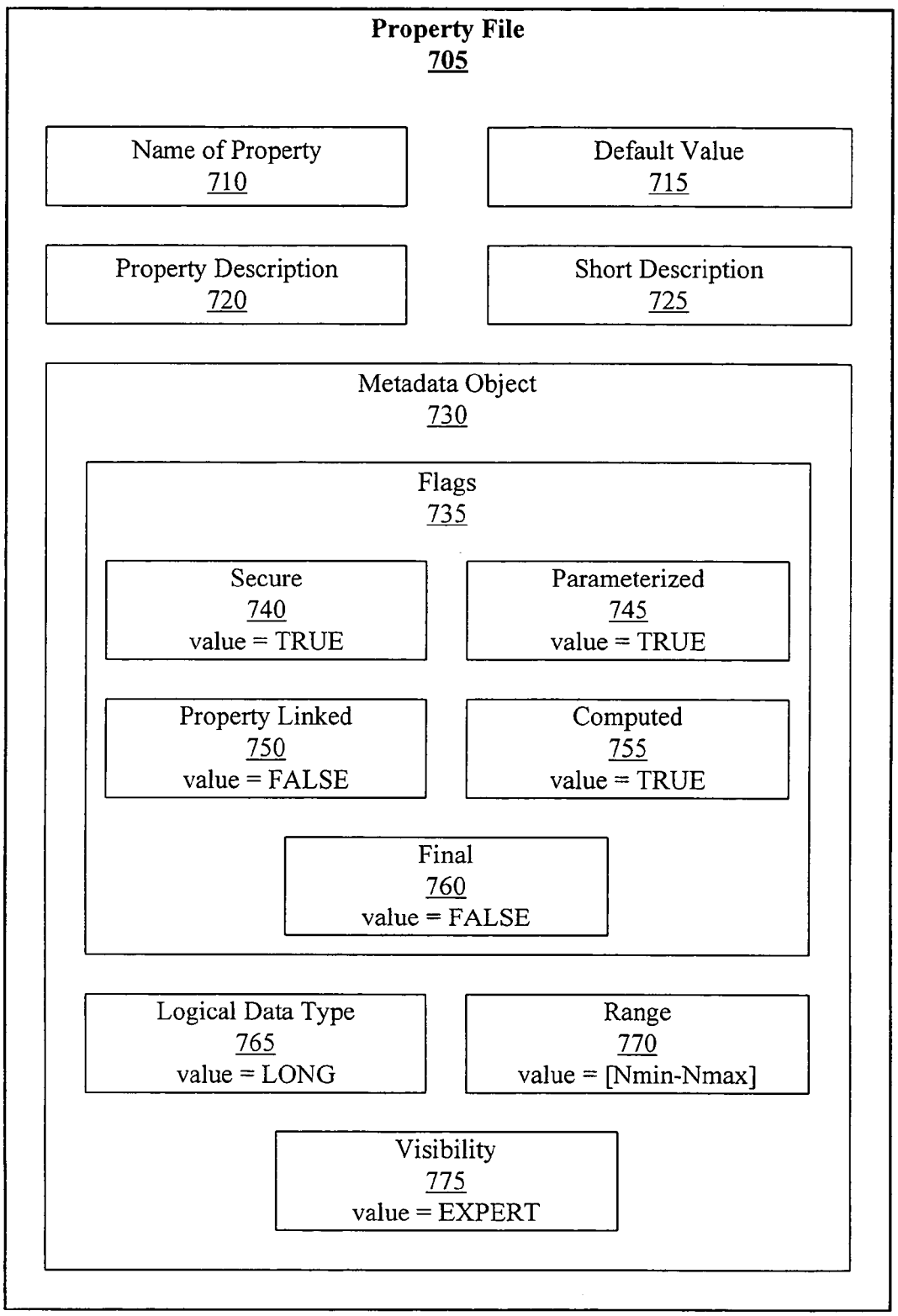
FIG. 7 is an illustration of an embodiment of a property sheet for the generation of a configuration.

FIG. 7 is an illustration of an embodiment of a property file for the generation of a configuration. In this illustration, the property file 705 includes various data regarding a property, including, for example, a name of the property 710, a default value of the property 715, a property description 720, and a short description of the property 725.

In an embodiment of the invention, the property file 705 may also include a metadata object to include certain attributes. The metadata object may include certain flags 735 and certain other metadata 740, which contain attributes that affect the application of the properties in the generation of a configuration. In an embodiment, the use of the property sheet provides an efficient process for transferring abstract configuration elements in the process of transparently resolving a configuration for a system during runtime.

In an embodiment of the invention, the metadata object includes metadata that enriches the properties in the generation of a configuration. In an embodiment, the flags may include a Secure flag 740 (a true value here indicating that the value is encrypted), a Parameterized flag 745 (a true value here indicating that the property value should be treated as a parameter), a Property Linked flag (a false value here indicating that the property is not interpreted as a data link), a Computed flag 755 (a true value here indicating that the property should be interpreted as an expression for calculation), and a Final flag 760 (a false value here indicating that the value is not final and may be overridden by the system configuration).

Other attributes may further add value to the use of the properties. For example, attributes may include a Logical Data Type attribute 765 to indicate the type of data contained (a long string here indicating that the property should be interpreted as a string), a Range attribute 770 to indicate the range of the values that may be stored in the configuration (the value here indicating the value must be between Nmin and Nmax), and a Visibility attribute 775 (an expert value here indicating that only expert users can see this particular property). The attributes illustrated are only examples of possible metadata that may be provided, and do not illustrate all types of attributes that may be includes in a property sheet under an embodiment of the invention.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A server comprising:
    a memory to hold a portion of a database, the database containing a set of abstract computer system configuration elements that are independent of a particular computer system configuration;
    a configuration machine to generate an abstract template based on the set of abstract computer system configuration elements, the template is dynamically modifiable based on a computer system configuration and an intended use of a requesting computer system;
    a resolving engine to receive a request from the requesting computer system, and dynamically modify the template according to the computer system configuration and the intended use of the requesting computer system,
    wherein the set of abstract computer system configuration elements include attributes setting a limit on the modification of the template.

2. The server of claim, 1 wherein the resolving engine modifies the template if one or more requesting computer systems do not exceed the limit.

3. A computer-readable medium having stored thereon data representing sequences of instructions that, when executed by a processor, cause the processor to perform operations comprising:
    producing a set of abstract computer system configuration elements that are independent of a particular computer system configuration;
    generating an abstract template based on the set of abstract computer system configuration elements, the template is dynamically modifiable based on a computer system configuration and an intended use of a requesting computer system;
    receiving a request from the requesting computer system and dynamically modifying the template according to the computer system configuration and the intended use of the requesting computer system,
    wherein the set of abstract computer system configuration elements include attributes setting limit on the modification of the template.

4. A method comprising:
    producing a set of abstract computer system configuration elements that are independent of a particular computer system configuration;
    generating an abstract template based on the set of abstract computer system configuration elements, the template is dynamically modifiable based on a computer system configuration and an intended use of a requesting computer system;
    receiving a request from the requesting computer system and dynamically modifying the template according to the computer system configuration and the intended use of the requesting computer system,
    wherein the set of abstract configuration elements include setting a limitation on the modification of the template.

* * * * *